United States Patent
Dudar

(10) Patent No.: US 11,987,255 B2
(45) Date of Patent: May 21, 2024

(54) VEHICLE AND METHOD FOR SELECTIVELY CALIBRATING SUCH VEHICLE OPERATION ACCORDING TO CURRENT CONDITIONS

(71) Applicant: FORD GLOBAL TECHNOLOGIES, LLC, Dearborn, MI (US)

(72) Inventor: Aed M. Dudar, Canton, MI (US)

(73) Assignee: FORD GLOBAL TECHNOLOGIES, LLC, Dearborn, MI (US)

(*) Notice: Subject to any disclaimer, the term of this patent is extended or adjusted under 35 U.S.C. 154(b) by 68 days.

(21) Appl. No.: 17/733,335

(22) Filed: Apr. 29, 2022

(65) Prior Publication Data

US 2022/0258744 A1 Aug. 18, 2022

Related U.S. Application Data

(63) Continuation of application No. 16/266,012, filed on Feb. 2, 2019, now Pat. No. 11,338,816.

(51) Int. Cl.
*B60W 50/00* (2006.01)
*G05B 17/02* (2006.01)

(52) U.S. Cl.
CPC ............ *B60W 50/00* (2013.01); *G05B 17/02* (2013.01); *B60W 2050/0026* (2013.01); *B60W 2050/0028* (2013.01); *B60W 2050/0075* (2013.01); *B60W 2050/0083* (2013.01); *B60W 2555/20* (2020.02); *B60W 2556/45* (2020.02); *B60W 2556/65* (2020.02)

(58) Field of Classification Search
CPC ............ B60W 50/00; B60W 2555/20; B60W 2556/65; B60W 2050/0026; B60W 2050/0028; B60W 2050/0077; B60W 2050/0083; G05B 17/02
USPC ......................................................... 701/32.9
See application file for complete search history.

(56) References Cited

U.S. PATENT DOCUMENTS

| | | | |
|---|---|---|---|
| 4,058,796 A * | 11/1977 | Oishi .................. | G07C 5/0816 340/459 |
| 5,189,621 A * | 2/1993 | Onari ................. | B60K 31/0008 123/480 |
| 5,555,515 A * | 9/1996 | Tomita .................... | H04S 1/007 708/300 |
| 6,091,669 A * | 7/2000 | Chen ........................ | G01V 1/28 367/75 |
| 6,127,947 A * | 10/2000 | Uchida .............. | B60G 17/0195 340/999 |

(Continued)

FOREIGN PATENT DOCUMENTS

| CN | 109747654 A * | 5/2019 |
|---|---|---|
| CN | 109747654 A | 5/2019 |

(Continued)

*Primary Examiner* — Richard A Goldman
(74) *Attorney, Agent, or Firm* — Joseph Zane; Brooks Kushman P.C

(57) ABSTRACT

A data map is modeled to generate a modeled data map, the data map including a calibration to control vehicle operation over various weather conditions encountered by a vehicle, the modeled data map characterizing data elements of the data map according to a mathematical model. The modeled data map is sent to the vehicle to expand into at least a portion of the data map to control the vehicle operation.

24 Claims, 7 Drawing Sheets

(56) References Cited

U.S. PATENT DOCUMENTS

| | | | | |
|---|---|---|---|---|
| 6,204,857 | B1* | 3/2001 | Piazza | G06T 15/04 345/582 |
| 6,208,948 | B1* | 3/2001 | Klingler | G06F 11/2294 702/183 |
| 6,622,070 | B1* | 9/2003 | Wacker | B60H 1/2206 701/32.7 |
| 6,675,081 | B2* | 1/2004 | Shuman | B60R 25/302 701/48 |
| 7,395,138 | B2* | 7/2008 | Kondoh | G05G 1/38 701/1 |
| 7,463,973 | B2* | 12/2008 | Okude | G01C 21/3492 701/428 |
| 8,442,699 | B2* | 5/2013 | Takamatsu | B60W 40/10 701/58 |
| 8,782,328 | B2* | 7/2014 | Fischer | H03M 7/40 711/E12.04 |
| 8,909,386 | B2 | 12/2014 | Takeuchi et al. | |
| 9,348,577 | B2* | 5/2016 | Hoffman | G06F 11/1464 |
| 9,731,668 | B2* | 8/2017 | Gusikhin | B60R 16/037 |
| 10,023,323 | B1* | 7/2018 | Roberts | B64U 10/13 |
| 10,042,629 | B2* | 8/2018 | Sarkar | G06F 8/658 |
| 10,144,275 | B2* | 12/2018 | Gaddis | G02F 1/0121 |
| 10,176,634 | B2* | 1/2019 | Micks | G06V 20/588 |
| 10,889,272 | B2* | 1/2021 | Lee | B60W 50/0097 |
| 11,021,165 | B2* | 6/2021 | Noguchi | H04W 4/40 |
| 11,029,678 | B2* | 6/2021 | von Sobbe | G05B 23/0254 |
| 11,796,129 | B1* | 10/2023 | Fernandez | F01P 7/14 |
| 2002/0072869 | A1* | 6/2002 | Stiller | G01S 17/931 702/90 |
| 2002/0165064 | A1* | 11/2002 | Miki | B60W 30/182 477/45 |
| 2003/0225495 | A1* | 12/2003 | Coelingh | B60W 10/04 701/41 |
| 2005/0065713 | A1* | 3/2005 | Yamada | G01C 21/34 701/400 |
| 2005/0137769 | A1* | 6/2005 | Takamatsu | B60T 7/22 701/1 |
| 2005/0143893 | A1* | 6/2005 | Takamatsu | B60W 10/18 701/84 |
| 2005/0154506 | A1* | 7/2005 | Takamatsu | B60W 40/02 701/1 |
| 2006/0261932 | A1* | 11/2006 | Ando | G07C 9/00182 340/426.14 |
| 2007/0003163 | A1* | 1/2007 | Lee | G01B 11/2441 382/284 |
| 2007/0142987 | A1* | 6/2007 | Takamatsu | B60W 30/00 701/41 |
| 2008/0024296 | A1* | 1/2008 | Jeong | G08C 17/02 340/539.26 |
| 2008/0071466 | A1* | 3/2008 | Downs | G08G 1/0104 701/117 |
| 2009/0012675 | A1* | 1/2009 | Laghrari | G07C 5/008 701/31.4 |
| 2011/0264844 | A1* | 10/2011 | Fischer | H03M 7/40 711/E12.008 |
| 2011/0282660 | A1* | 11/2011 | Hetherington | G10L 21/0208 704/226 |
| 2013/0131892 | A1* | 5/2013 | Hashimoto | G01C 21/3469 701/1 |
| 2013/0293900 | A1* | 11/2013 | Sogard | G03F 7/00 356/616 |
| 2014/0122045 | A1* | 5/2014 | Mewes | G06F 30/20 703/6 |
| 2014/0201126 | A1* | 7/2014 | Zadeh | A61B 5/165 706/52 |
| 2014/0214255 | A1* | 7/2014 | Dolgov | G05D 1/0276 701/23 |
| 2015/0081148 | A1* | 3/2015 | Heap | B60W 10/06 180/65.265 |
| 2015/0127249 | A1* | 5/2015 | Strau | G08G 1/0112 701/439 |
| 2016/0303979 | A1* | 10/2016 | Heyse | B60L 50/50 |
| 2016/0357187 | A1* | 12/2016 | Ansari | G06T 19/20 |
| 2017/0016266 | A1* | 1/2017 | Van Wiemeersch | G08B 21/18 |
| 2017/0023945 | A1* | 1/2017 | Cavalcanti | G08G 1/04 |
| 2017/0144666 | A1* | 5/2017 | Yonan | F02N 11/0814 |
| 2018/0075670 | A1* | 3/2018 | Rajakondala | G06F 8/654 |
| 2018/0081361 | A1* | 3/2018 | Robinson | G01C 21/20 |
| 2018/0089993 | A1* | 3/2018 | Masuda | G08G 1/0129 |
| 2018/0097923 | A1* | 4/2018 | Pandurangarao | H04W 68/005 |
| 2018/0134116 | A1* | 5/2018 | Chen | B60N 2/976 |
| 2018/0154779 | A1* | 6/2018 | Chol | B60L 1/00 |
| 2018/0267538 | A1* | 9/2018 | Shum | B60W 30/09 |
| 2018/0320645 | A1* | 11/2018 | McQuillen | F02D 41/222 |
| 2019/0121568 | A1* | 4/2019 | Gerlach | G06F 3/0649 |
| 2019/0126892 | A1* | 5/2019 | Lee | B60W 10/18 |
| 2019/0204427 | A1* | 7/2019 | Abari | G01S 17/86 |
| 2019/0286086 | A1* | 9/2019 | Gardner | G05B 17/02 |
| 2020/0064229 | A1* | 2/2020 | Kang | G01M 15/02 |
| 2020/0184278 | A1* | 6/2020 | Zadeh | G06N 3/044 |
| 2020/0231023 | A1* | 7/2020 | Sathasivam | H01M 10/633 |
| 2020/0247424 | A1* | 8/2020 | Dudar | B60W 50/00 |
| 2020/0391576 | A1* | 12/2020 | Ostrowski | B60J 1/002 |
| 2021/0152997 | A1* | 5/2021 | Manivasagam | H04W 4/46 |
| 2021/0158143 | A1* | 5/2021 | Baughman | G06N 3/08 |
| 2021/0200221 | A1* | 7/2021 | Omari | G06N 7/01 |
| 2021/0373509 | A1* | 12/2021 | Borah | G06F 40/30 |
| 2021/0397443 | A1* | 12/2021 | Ishikawa | G06F 8/656 |
| 2022/0035965 | A1* | 2/2022 | Liebman | G06F 18/214 |
| 2022/0227231 | A1* | 7/2022 | Husain | B60L 3/0046 |
| 2022/0258744 | A1* | 8/2022 | Dudar | G05B 19/042 |

FOREIGN PATENT DOCUMENTS

| | | | | |
|---|---|---|---|---|
| CN | 109829649 | A * | 5/2019 | |
| CN | 109829649 | A | 5/2019 | |
| CN | 110110730 | A * | 8/2019 | |
| CN | 110110730 | A | 8/2019 | |
| CN | 110361334 | A * | 10/2019 | |
| CN | 110361334 | A | 10/2019 | |
| CN | 111348029 | A * | 6/2020 | |
| CN | 111348029 | A | 6/2020 | |
| DE | 102020102662 | A1 * | 8/2020 | B60W 50/00 |
| DE | 102020102662 | A1 | 8/2020 | |
| JP | 2008250665 | A * | 10/2008 | |
| JP | 2008250665 | A | 10/2008 | |

* cited by examiner

VEHICLE AND METHOD FOR SELECTIVELY CALIBRATING SUCH VEHICLE OPERATION ACCORDING TO CURRENT CONDITIONS

CROSS-REFERENCE TO RELATED APPLICATIONS

This application is a continuation of U.S. application Ser. No. 16/266,012 filed Feb. 2, 2019, now issued as U.S. Pat. No. 11,338,816 on May 24, 2022, the disclosure of which is hereby incorporated in its entirety by reference herein.

TECHNICAL FIELD

Aspects of the disclosure generally relate to over-the-air (OTA) flash updating of controllers, and more specifically to using data regression techniques to model calibration data for efficient transfer and reproduction.

BACKGROUND

Over-the-air (OTA) flash updating is convenient, as vehicles do not need to visit a dealership to be updated. When new software strategy or calibration fix is available, customers can receive the new software directly while the vehicle is parked at home. During the time the vehicle is being, the vehicle must remain idle and cannot be driven. With the increase in ride-sharing, vehicle-sharing, and autonomous vehicles, this downtime is lost opportunity to be transporting customers and goods.

SUMMARY

In one or more illustrative examples, a system includes a vehicle having a hardware processor programmed to identify a portion of a data map to expand according to current vehicle conditions, the data map specifying a calibration to control vehicle operation over various vehicle conditions, reproduce the portion of the data map using a modeled data map that characterizes data elements of the data maps according to a mathematical model, and utilize the calibration to control the vehicle operation.

In one or more illustrative examples, a method includes modeling a data map to generate a modeled data map, the data map including a calibration to control vehicle operation over various weather conditions encountered by a vehicle, the modeled data map characterizing data elements of the data map according to a mathematical model; and sending the modeled data map to the vehicle to expand into at least a portion of the data map to control the vehicle operation.

In one or more illustrative examples, a system includes a server including a hardware processor programmed to model a data map to generate a modeled data map, the data map including a calibration to control vehicle operation over various weather conditions encountered by a vehicle, the modeled data map characterizing data elements of the data map according to a mathematical model; and send the modeled data map to the vehicle to expand into at least a portion of the data map to control the vehicle operation.

DETAILED DESCRIPTION

Figure 1:
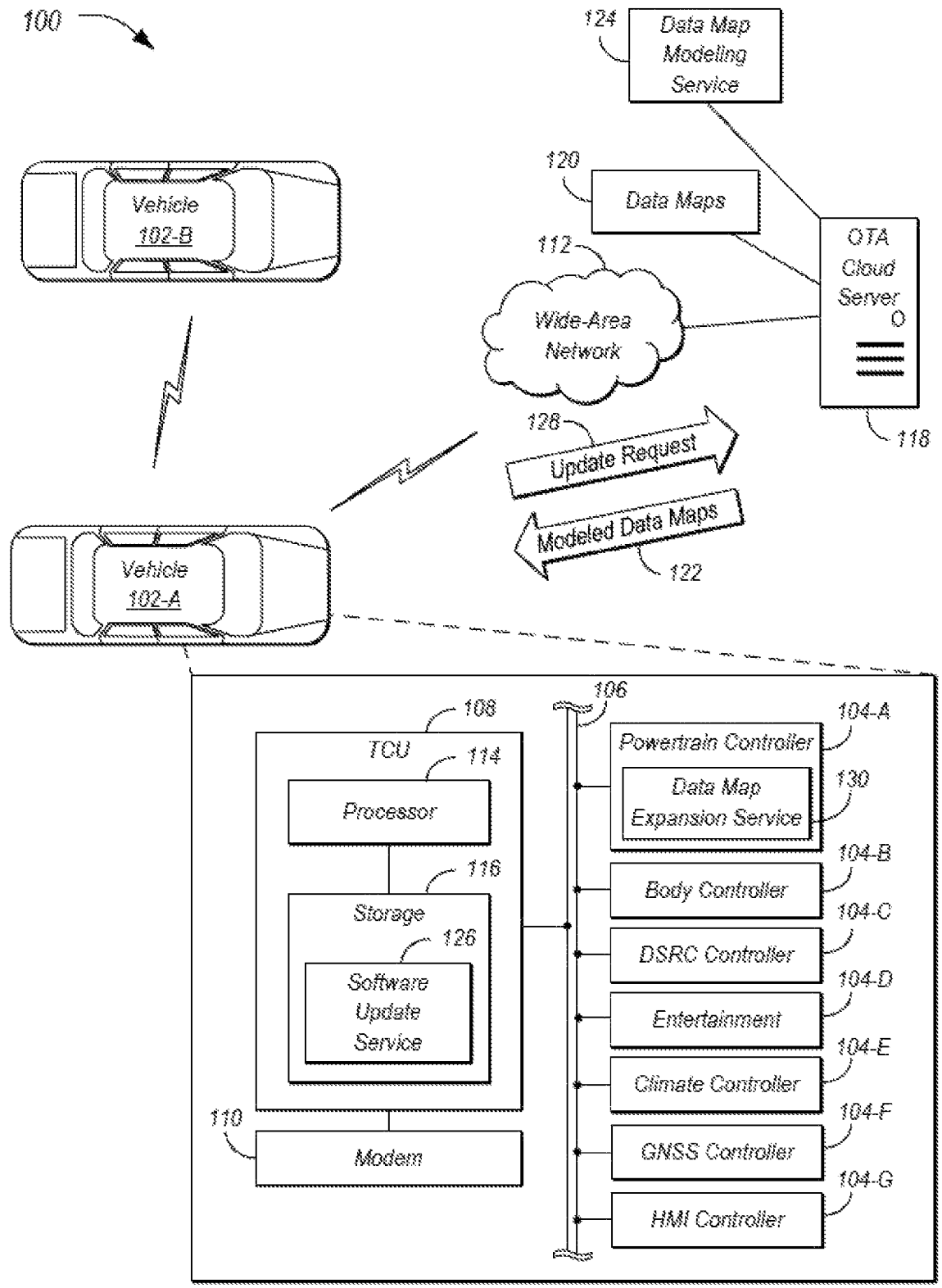
FIG. 1 illustrates an example system using data regression techniques to model calibration data for efficient transfer and reproduction.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Powertrain controllers and other onboard components typically contain many two-dimensional (2D) and/or three-dimensional (3D) maps as calibrations that compensate for environmental and operating condition factors. These factors may include, as some examples, ambient temperature, barometric pressure, humidity, and vehicle operating conditions (e.g., electrical load, engine RPM, vehicle speed, etc.). These data maps may be of significant size. As a result, downloading these large data sets over the air consumes time and bandwidth. There are times when many vehicles need to be reflashed, and in such situations the costs in time and bandwidth are significant.

A data and time efficient onboard controller reflash and reproduction strategy may be utilized to address these concerns. With the confluence of wireless connectivity and onboard computing power available in current and planned, OTA reprogramming of vehicles controllers may be streamlined. Instead of programming massive calibration maps that cover a wide span of temperature, humidity and barometric pressure, an improved approach instead characterizes the 2D or 3D map according to a mathematical model.

In an example, many 2D tables may be modeled either by straight line equations (e.g., $Y=mx+b$), or according to a second order or higher polynomial (e.g., $Y=ax^2+bx+c$). Likewise, thresholding 3D tables with x and y independent axes may be characterized according to a 3D plane equation (e.g., $Z=aY+bX+c$), or by a higher-order polynomial if the table data is nonlinear. For discontinuous curves, the described approach may partition the curves into linear portions and regresses each portion accordingly.

Hence, to perform an OTA update including calibration tables, the update server may be configured to regress each table to establish a mathematical model for each. Also, for each mathematical regression, a range of values (e.g., x values for a 2D table, x and y values for a 3D table, etc.) may be provided for download to the target vehicle being flashed. Thus, instead of downloading the entire memory intensive 2D or 3D tables with individual cells (e.g., $x_1$, $y_1$, $z_1$, $x_2$, $y_2$, etc.), the improved approach instead downloads regressed equations for each table along with a desired range for its independent axis or axes.

Vehicles may determine to reproduce subsets of the calibration tables based on projected usage of the vehicle. For instance, if the vehicle resides in a hot climate at sea level, the vehicle may elect not to reproduce the entire 3D table for all barometric pressure and ambient temperature ranges. Or, the vehicle may elect to reproduce portions of the tables based on projected need to save memory. For instance, if the vehicle operates in a hot climate, then there is no need to reproduce the table cells pertinent to cold climates, saving memory. Similarly, vehicles operating at sea level need not reproduce tables for high altitude. The reproduction of content may be based on anticipated onboard consumption which is governed by the environmental factors of the vehicle's location. (hot vs cold, sea level vs altitude, dry vs humid, etc.). Yet, since vehicle stores the regressed equations onboard, the vehicle may reproduce new portions of the calibration tables on demand to match a new environmental range requirement.

In a simple example of a 2D linear table with ten elements, the slope (m), y intercept (b), range ($X_{begin}$ and $X_{end}$), and x increment may be transferred OTA. Notably, only five parameters are transferred instead of ten, a 50% reduction in data transfer. At the vehicle, the ten original elements of the 2D table may then be reproduced (e.g., onboard the powertrain controller if the table is for powertrain configuration) using the onboard computer processing. With a 3D table having one hundred elements (e.g., a ten by ten table), the efficiency may be magnified as only the coefficients of the plane a, b, and c along with the x and y ranges and x and y increments are transmitted OTA. Thus, only nine parameters are transferred wirelessly during the reflash process instead of one hundred, yielding a reduction in data transfer of 90%.

By compressing the tables in the calibrations into their shortened mathematical representations, an efficient in situ reflashing of vehicles is achieved. Flashing thousands of vehicles wirelessly takes less time with proposed method and frees up the cloud server to perform other tasks.

Furthermore, the described approach may reproduce the calibration tables according to a hierarchy. For example, tables having to do with engine and transmission controls are reproduced first to allow vehicle to be driven. Tables associated with diagnostics may be reproduced later, as diagnostics have entry conditions which likely will not be met until later in a drive cycle.

As a further enhancement, the described approach may also reproduce data tables for other vehicles using vehicle-to-vehicle communications, such as dedicated short-range communications (DSRC). Many vehicles are being designed to have at least two modes of communications: modem-based cellular and short-range radio (DSRC). Should a peer vehicle lose contact with the update server, then that vehicle may request calibration tables from a vehicle having the knowledge of the regression equations. Accordingly, peer vehicles may obtain the calibration tables from another vehicle sharing the regressed data model, or may obtain the values from a vehicle if the peer vehicle lacks the capability to expand the regressed data model into the full data table.

FIG. 1 illustrates an example system 100 using data regression techniques to model calibration data for efficient transfer and reproduction. As illustrated, the vehicles 102-A and 102-B (collectively 102) includes a plurality of vehicle controllers 104 in communication over one or more vehicle buses 106. The system 100 also includes an OTA cloud server 118 configured to maintain data maps 120 and other software update information to be provided to the vehicles 102. The OTA cloud server 118 may utilize a data map modeling service 124 to determine a mathematically modeled or regressed version of the data maps 120, which is referred to herein as modeled data maps 122. The vehicle 102 further includes a telematics control unit (TCU) 108 configured to send data update requests to the OTA cloud server 118, as well as to receive the modeled data maps 122 from the OTA cloud server 118. The TCU 108 may utilize a software update service 126 to request and receive software updates from the OTA cloud server 118. A data map expansion service 130 may be used by the vehicle 102 to process modeled data maps 122 back into a full version of the data maps 120 for use by the vehicle 102. The vehicles 102-A and 102-B may also be configured to communicate with one another, e.g., via use of their DSRC controllers 104-C, to provide for the direct passing of data maps and/or modeled data maps 122 between vehicles 102. It should be noted that the system 100 is merely an example, and other arrangements or combinations of elements may be used.

The vehicle 102 may include various types of automobile, crossover utility vehicle (CUV), sport utility vehicle (SUV), truck, recreational vehicle (RV), boat, plane or other mobile machine for transporting people or goods. In many cases, the vehicle 102 may be powered by an internal combustion engine. As another possibility, the vehicle 102 may be a hybrid electric vehicle (HEV) powered by both an internal combustion engine and one or more electric motors, such as a series hybrid electric vehicle (SHEV), a parallel hybrid electrical vehicle (PHEV), or a parallel/series hybrid electric vehicle (PSHEV). As the type and configuration of vehicle 102 may vary, the capabilities of the vehicle 102 may correspondingly vary. As some other possibilities, vehicles 102 may have different capabilities with respect to passenger capacity, towing ability and capacity, and storage volume. For title, inventory, and other purposes, vehicles 102 may be associated with unique identifiers, such as VINs.

The vehicle 102 may include a plurality of controllers 104 configured to perform and manage various vehicle 102 functions under the power of the vehicle battery and/or drivetrain. As depicted, the example vehicle controllers 104 are represented as discrete controllers 104-A through 104-G. However, the vehicle controllers 104 may share physical hardware, firmware, and/or software, such that the functionality from multiple controllers 104 may be integrated into a single controller 104, and that the functionality of various such controllers 104 may be distributed across a plurality of controllers 104.

As some non-limiting vehicle controller 104 examples: a powertrain controller 104-A may be configured to provide control of engine operating components (e.g., idle control components, fuel delivery components, emissions control components, etc.) and for monitoring status of such engine operating components (e.g., status of engine codes); a body controller 104-B may be configured to manage various power control functions such as exterior lighting, interior lighting, keyless entry, remote start, and point of access status verification (e.g., closure status of the hood, doors and/or trunk of the vehicle 102); a radio transceiver controller 104-C may be configured to communicate with key fobs, mobile devices, or other local vehicle 102 devices; an entertainment controller 104-D may be configured to support voice command and BLUETOOTH interfaces with the driver and driver carry-on devices; a climate control management controller 104-E may be configured to provide control of heating and cooling system components (e.g., compressor clutch, blower fan, temperature sensors, etc.); a global positioning system (GPS) controller 104-F may be configured to provide vehicle location information; and a human-machine interface (HMI) controller 104-G may be configured to receive user input via various buttons or other controls, as well as provide vehicle status information to a driver, such as fuel level information, engine operating temperature information, and current location of the vehicle 102.

The vehicle bus 106 may include various methods of communication available between the vehicle electronic control units (ECUs) 104, as well as between the TCU 108 and the vehicle ECUs 104. As some non-limiting examples, the vehicle bus 106 may include one or more of a vehicle controller area network (CAN), an Ethernet network, and a media-oriented system transfer (MOST) network. Further aspects of the layout and number of vehicle buses 106 are discussed in further detail below.

The TCU 108 may include network hardware configured to facilitate communication between the vehicle ECUs 104 and with other devices of the system 100. For example, the TCU 108 may include or otherwise access a cellular modem 110 configured to facilitate communication with a wide-area network 112. The wide-area network 112 may include one or more interconnected communication networks such as the Internet, a cable television distribution network, a satellite link network, a local area network, and a telephone network, as some non-limiting examples. As another example, the TCU 108 may utilize one or more of BLUETOOTH, Wi-Fi, or wired USB network connectivity to facilitate communication with the wide-area network 112 via the user's mobile device.

The TCU 108 may further include various types of computing apparatus in support of performance of the functions of the TCU 108 described herein. In an example, the TCU 108 may include one or more processors 114 configured to execute computer instructions, and a storage 116 medium on which the computer-executable instructions and/or data may be maintained. A computer-readable storage medium (also referred to as a processor-readable medium or storage 116) includes any non-transitory (e.g., tangible) medium that participates in providing data (e.g., instructions) that may be read by a computer (e.g., by the processor(s)). In general, the processor 114 receives instructions and/or data, e.g., from the storage 116, etc., to a memory and executes the instructions using the data, thereby performing one or more processes, including one or more of the processes described herein. Computer-executable instructions may be compiled or interpreted from computer programs created using a variety of programming languages and/or technologies, including, without limitation, and either alone or in combination, JAVA, C, C++, C#, FORTRAN, PASCAL, VISUAL BASIC, PYTHON, JAVA SCRIPT, PERL, PL/SQL, etc.

The TCU 108 may be configured to include one or more interfaces from which vehicle information may be sent and received. In an example, the TCU 108 may be configured to facilitate the collection of DTC data and/or other vehicle information from the vehicle controllers 104 connected to the one or more vehicle buses 106. While only a single bus 106 is illustrated, it should be noted that in many examples, multiple vehicle buses 106 are included, with a subset of the controllers 104 connected to each bus 106. Accordingly, to access a given controller 104, the TCU 108 may be configured to maintain a mapping of which buses 106 are connected to which controllers 104, and to access the corresponding bus 106 for a controller 104 when communication with that particular controller 104 is desired.

The OTA cloud server 118 may include various types of computing apparatus, such as a computer workstation, a server, a desktop computer, a virtual server instance executed by a mainframe server, or some other computing system and/or device. Similar to the TCU 108, the OTA cloud server 118 generally include a memory on which computer-executable instructions may be maintained, where the instructions may be executable by one or more processors (not shown for clarity). Such instructions and other data may be stored using a variety of computer-readable media. In a non-limiting example, the OTA cloud server 118 may be configured to maintain the data maps 120 and the data map modeling service 124.

The data maps 120 may refer to configuration tables or other sets of data that are used by the controllers 104 of the vehicle 102 to provide for vehicle 102 configuration. In some examples, the data maps 120 may be 2D and may map a resultant value responsive to a pair of input variables. In other examples, data maps 120 may be 3D (or more) and may map a resultant value responsive to three (or more) input variables. In many cases, the data maps 120 may specify calibrations that compensate for environmental and operating condition factors. These factors may include, as some examples, ambient temperature, barometric pressure, humidity, and vehicle operating conditions (e.g., electrical load, engine RPM, vehicle speed, etc.). For instance, the data maps 120 may utilize these and other factors as inputs to providing a output value for use in compensating for the specified input conditions. As vehicles 102 may be designed to operate in a wide variety of conditions, the data maps 120 calibration maps may be of significant size.

The modeled data maps 122 refer to characterizations of the data maps 120 according to a mathematical model. In an example, many 2D tables may be modeled either by straight line equations (e.g., $Y=mx+b$), or according to a second order or higher polynomial (e.g., $Y=ax^2+bx+c$). Likewise, thresholding 3D tables with x and y independent axes may be characterized according to a 3D plane equation (e.g., $Z=aY+bX+c$), or by a higher-order polynomial if the table data is nonlinear. For discontinuous curves, the modeled data maps 122 may include a partition of a data map 120 curves into multiple linear portions, where each portion is modeled separately.

The data map modeling service 124 one application included on the storage of the OTA cloud server 118. The data map modeling service 124 may include instructions that, when executed by one or more processors of the OTA cloud server 118, cause the OTA cloud server 118 to use predictive modeling techniques to identify relationships between data elements of the data maps 120. The data modeling service 124 may be programmed to fit curves, lines, or other data models to the data points of the data maps 120, in such a manner that the differences between the distances of data points from the proposed curve or line is minimized.

For instance, the data map modeling service 124 may utilize linear regression, which is a technique that establishes a relationship between a dependent variable and one or more independent variables using a best-fit straight line or regression line. One example technique for fitting data using a linear regression is through use of a least squares method. This method minimizes the sum of the squares of the vertical deviations from each data point to the line in order to calculates the best-fit line. It should be noted that use of linear regression and the least squares method is only one example, and other regression techniques and methods may be used as well. For instance, the data map modeling service 124 may additionally or alternately model the data maps 120 using polynomial regression, where the best fit line is a curve rather than a straight line. The data map modeling service 124 may also be configured to identify discontinuities in the data of the data map 120 and may model the separate sections of the data map 120 independently.

The software update service 126 may be one application included on the storage 116 of the TCU 108. The software update service 126 may include instructions that, when executed by the processor 114 of the TCU 108, cause the TCU 108 to perform functions in relation to the requesting and receipt of software updates. In an example, the software update service 126 may be configured to send update requests 128 to the OTA cloud server 118 requesting updated vehicle 102 data maps 120. The software update service 126 may also be configured to receive modeled data maps 122 from the OTA cloud server 118 (either requested via update requests 128 or pushed to the vehicle 102 in other examples) and send the modeled data maps 122 over the vehicle buses 106 to the appropriate controller 104. In one example, the received updates from the OTA cloud server 118 may include identifiers indicating the controller for which the modeled data maps 122 are to be sent.

The data map expansion service 130 may be a service included on the controller 104 to be updated. As shown, a data map expansion service 130 is shown as installed to the powertrain controller 104-A; however, it should be noted that each controller supporting expansion of data maps 120 from modeled data maps 122 may include its own data map expansion service 130. In another example, the vehicle 102 may include a controller dedicated to performing the operations of the data map expansion service 130, where the other controllers 104 may request expansion services from the dedicated controller and receive the resultant data (e.g., via communication over the vehicle buses 106). In yet a further example, the services of the data map expansion service 130 may be provided by the TCU 108.

Regardless of location of the data map expansion service 130 functionality, the data map expansion service 130 may be configured to generate all or a portion of a data map 120 based on a modeled data map 122. For instance, the data map expansion service 130 may utilize the mathematical model (e.g., the best fit line) to recreate the values of the data map 120.

In some cases, the data map expansion service 130 may reproduce the entire data map 120 from the modeled data map 122. In other cases, data map expansion service 130 may reproduce only a portion of the data map 120 from the modeled data map 122. For instance, if the vehicle 102 resides in a hot climate at sea level, the vehicle 102 may elect not to reproduce an entire data map 120 for all barometric pressure and ambient temperature ranges. Or, the vehicle 102 may elect to reproduce portions of the data map 120 based on projected need to save memory. For instance, if the vehicle 102 operates in a hot climate, then there is no need to reproduce the table cells pertinent to cold climates. Similarly, vehicles 102 operating at sea level need not reproduce tables for high altitude. The reproduction of content may be based on anticipated onboard consumption which is governed by the environmental factors of the vehicle's location (hot vs cold, sea level vs altitude, dry vs humid, etc.). Yet, since the vehicle 102 stores the regressed equations onboard, the vehicle 102 may reproduce new portions of the data map 120 on demand to match a new environmental range requirement.

Figure 2:
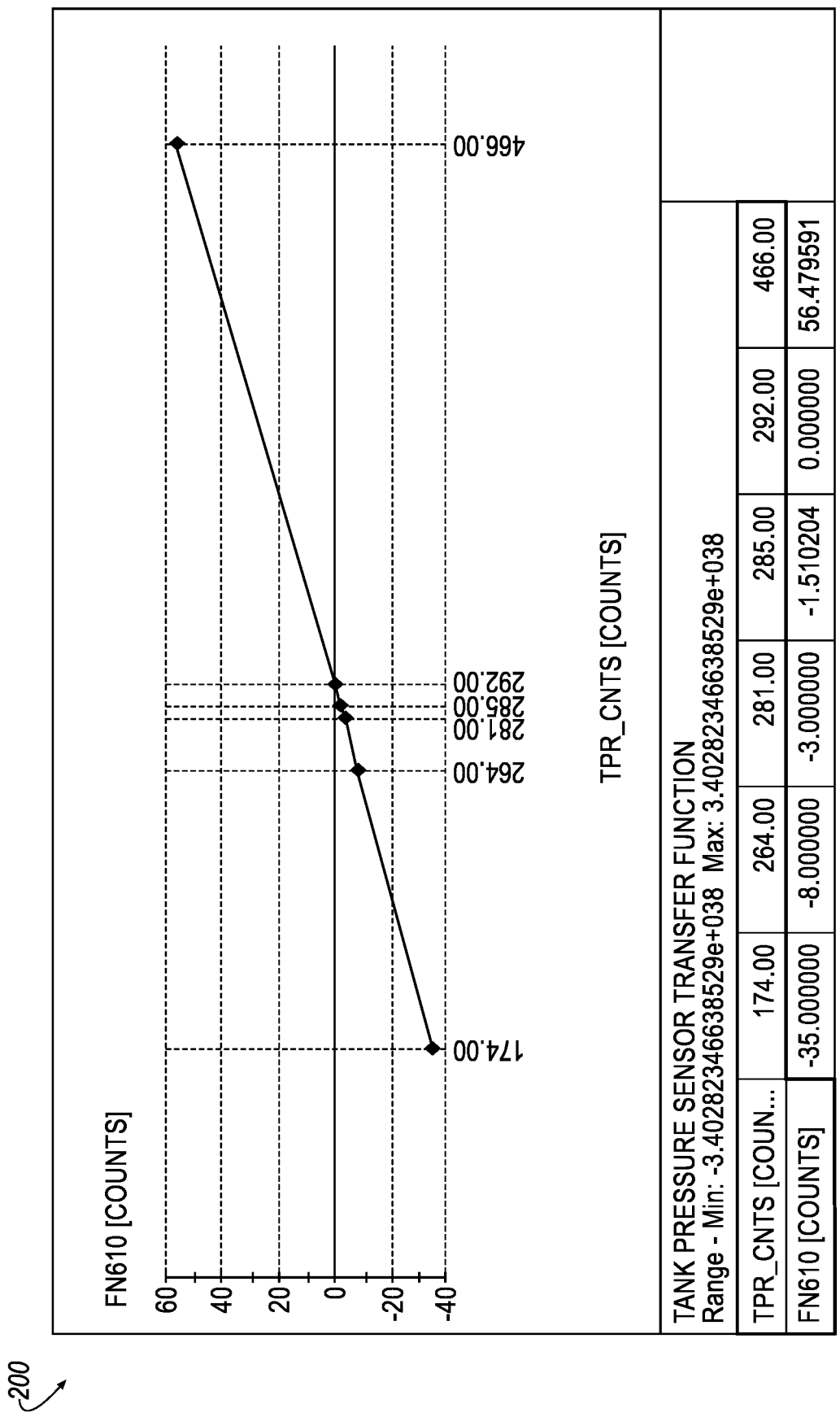
FIG. 2 illustrates an example of a 2D data map.

FIG. 2 illustrates an example 200 of a 2D data map 120. As shown the example map 120 illustrates a fuel tank pressure sensor transfer function. Notably, the function follows a straight line, which may be written as an equation of the form y=mx+b. Hence, the 2D data map 120 may be regressed into a modeled data map 122 specified as the coefficients m and b.

Figure 3:
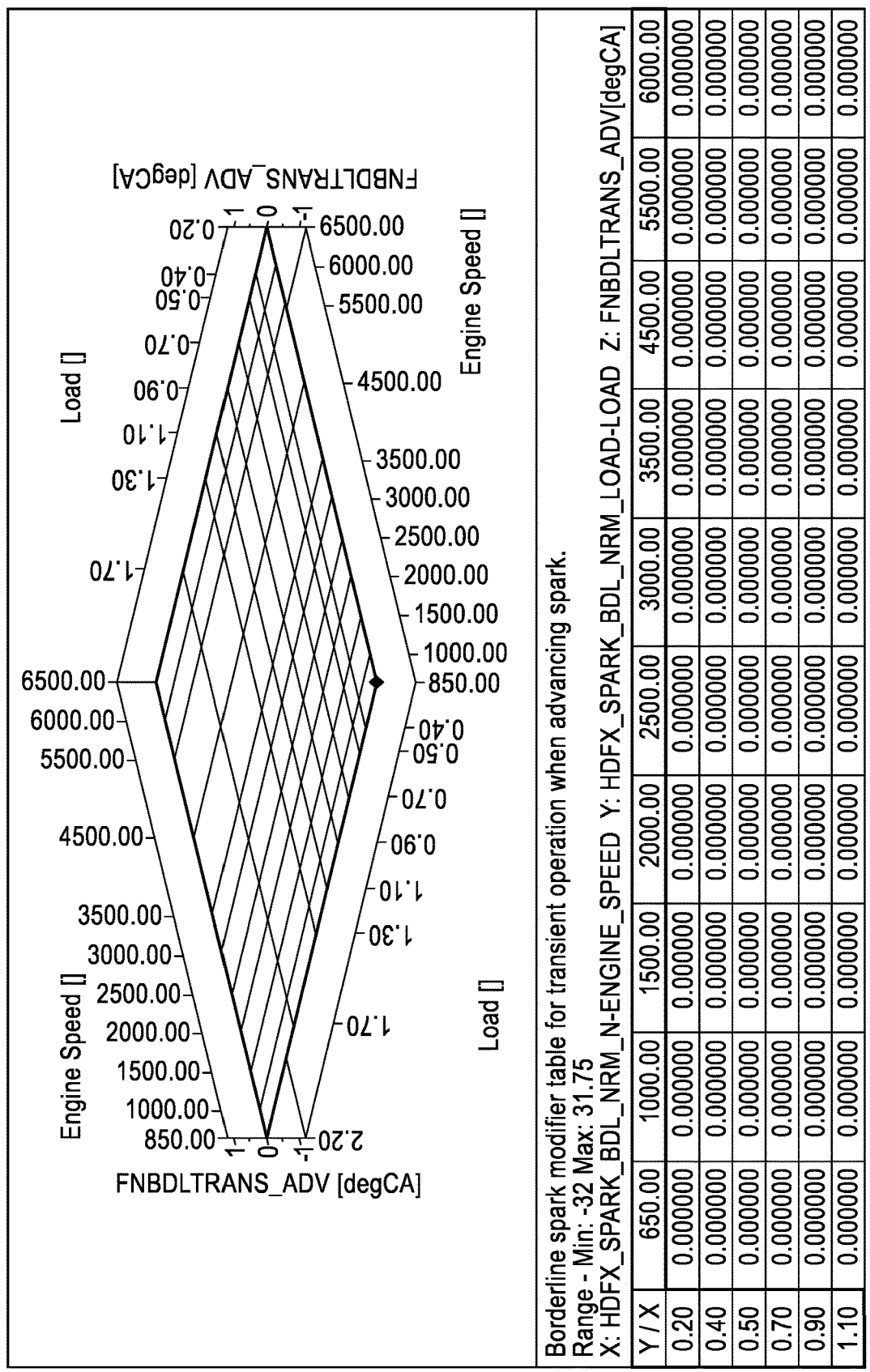
FIG. 3 illustrates an example of a 3D data map.

FIG. 3 illustrates an example 300 of a 3D data map 120. As shown, the example map 120 illustrates a borderline spark modifier table for transient operation when advancing spark. The inputs for the table are RPM of the engine of the vehicle 102 and load, and the output is spark advance. Notably, this example thresholding table is a linear plane. Hence, the 3D data map 120 may be regressed into a modeled data map 122 specified as XY plane coefficients, an x range, x increment, y range and y increment. The z values may accordingly be reproduced onboard.

Figure 4:
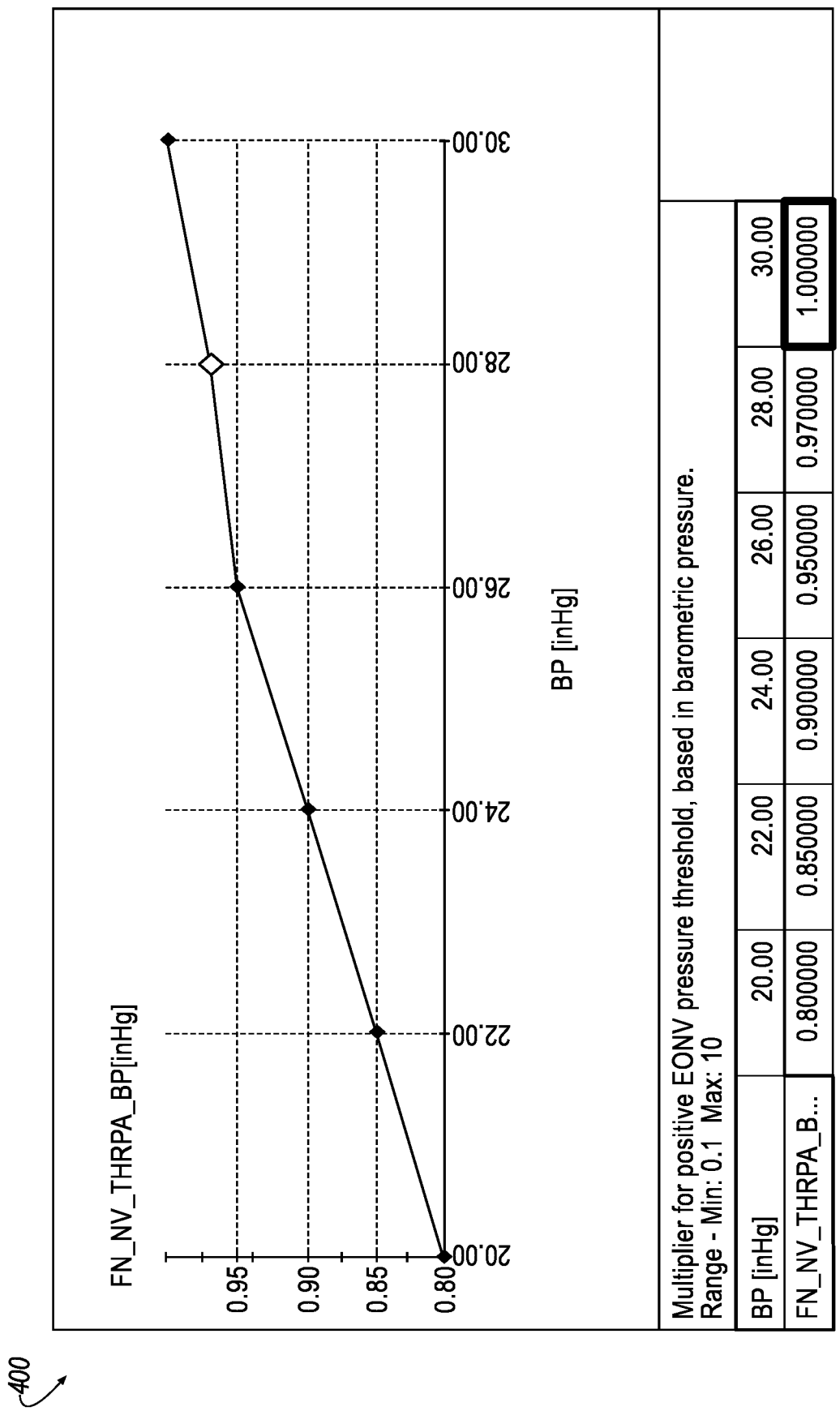
FIG. 4 illustrates an example of a 2D data map for which only a portion is to be reproduced.

FIG. 4 illustrates an example 400 of a 2D data map 120 for which only a portion is to be reproduced. As shown, the example map 120 illustrates a multiplier for a positive engine-off natural vacuum (EONV) pressure threshold based on barometric pressure. Accordingly, the 2D data map takes in barometric pressure (altitude) and outputs EONV threshold normalizer. Notably, if the vehicle 102 operates in a hot climate (e.g., during downtown Miami in the summer months), the entire map 120 is not needed for operation. Instead, only a portion of the map 120 (shown in the enclosed rectangle) may be reproduced on board by the vehicle 102 responsive to the vehicle 102 operating in a warm climate zone.

Figure 5:
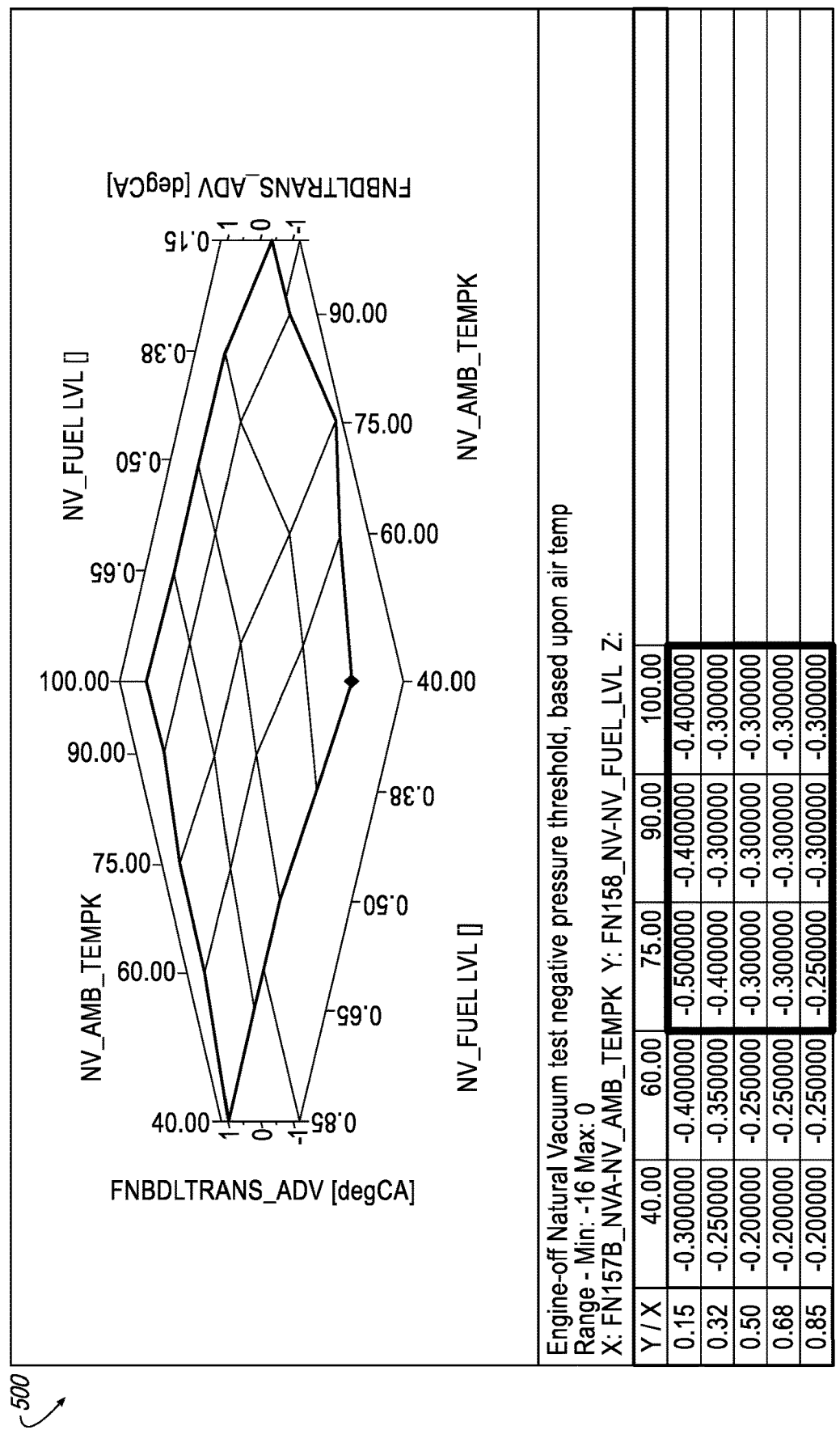
FIG. 5 illustrates an example of a 3D data map for which only a portion is to be reproduced.

FIG. 5 illustrates an example 500 of a 3D data map 120 for which only a portion is to be reproduced. As shown, the example map 120 illustrates a engine-off natural vacuum (EONV) test negative pressure threshold by air temperature. Accordingly, the 3D data map 120 may take in ambient temperature and output EONV thresholds. Again, if the vehicle 102 operates in a hot climate (e.g., during downtown Miami in the summer months), the entire map 120 is not needed for operation. Instead, only a portion of the map 120 (shown in the enclosed rectangle) may be reproduced on board by the vehicle 102 responsive to the vehicle 102 operating in a warm climate zone.

Figure 6:
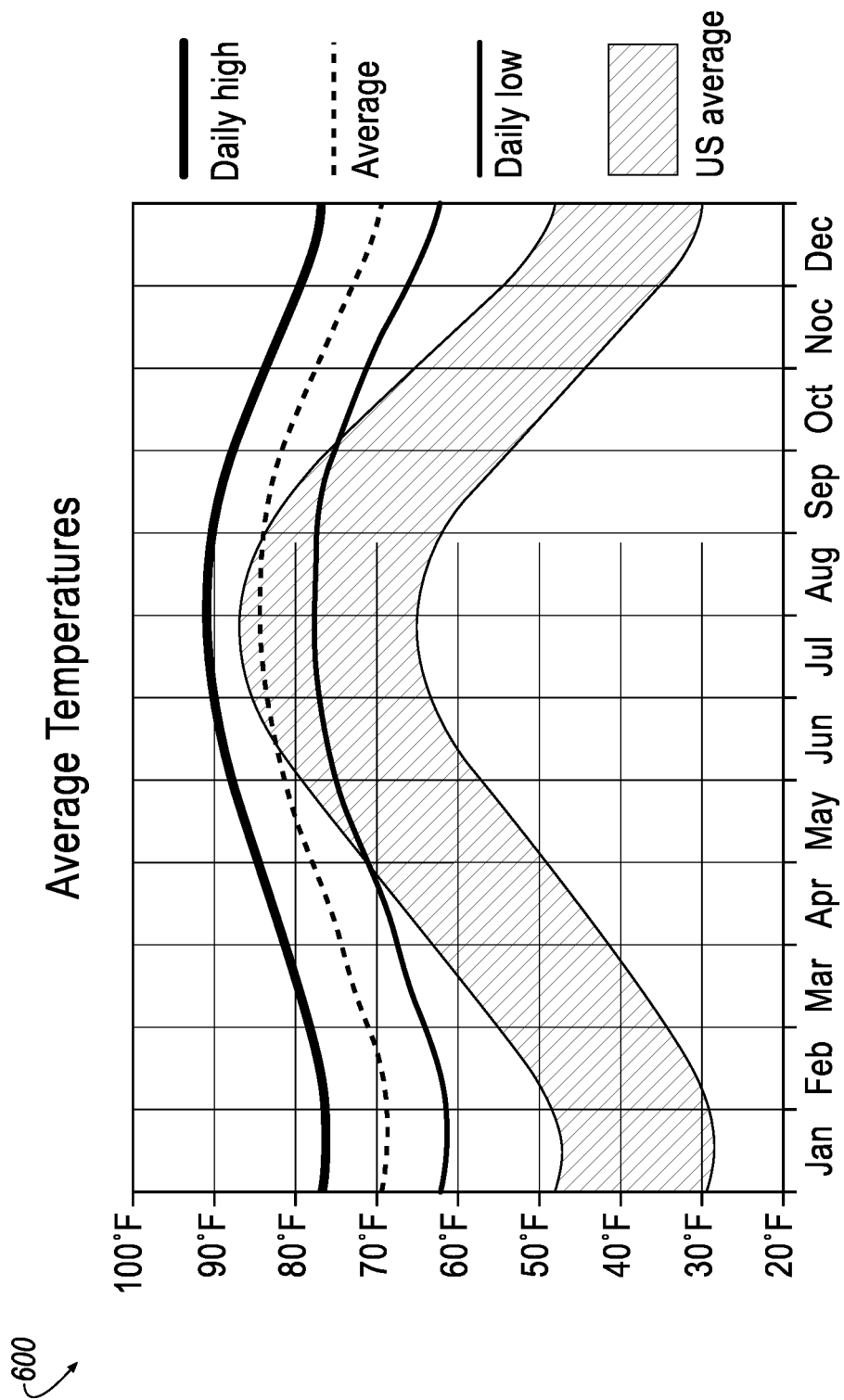
FIG. 6 illustrates an example chart of weather patterns for use in determining what portion of a data map is to be reproduced.

FIG. 6 illustrates an example chart 600 of weather patterns for use in determining what portion of a data map 120 is to be reproduced. As shown, the chart indicates average, high, and low temperatures by month for a geographic region in which the vehicle 102 is located. Using the chart 600, the vehicle 102 may be able to determine what subset of a data map 120 should be recreated. For example, the vehicle 102 may only reproduce values that are within the high and low temperature range for the current month.

Figure 7:
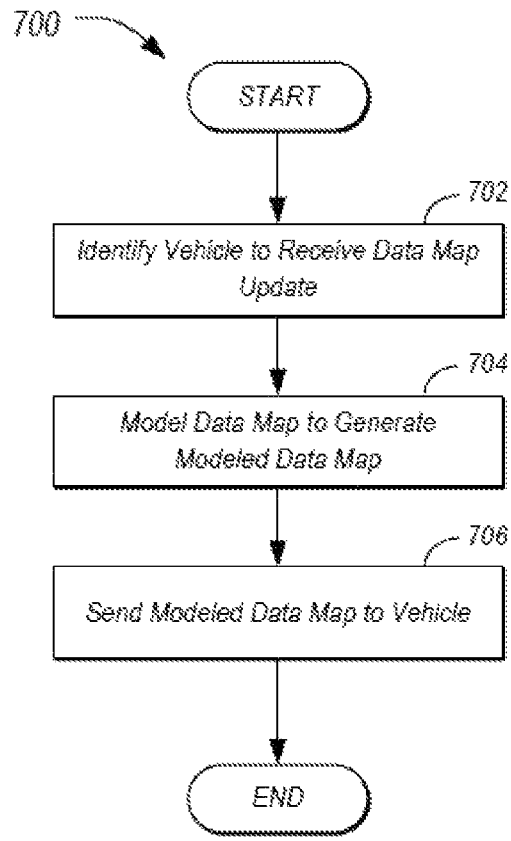
FIG. 7 illustrates an example process for the creation of modeled data maps from data 120.

FIG. 7 illustrates an example process 700 for the creation of modeled data maps 122 from data maps 120. In an example, the process 700 may be performed by the OTA cloud server 118 in communication with the elements of the system 100.

At operation 702, the OTA cloud server 118 identifies a vehicle 102 to receive a data map 120 update. In an example, the OTA cloud server 118 may receive an update request 128 from the software update service 126 of the vehicle 102 to be updated. In another example, the OTA cloud server 118 may determine to send an update to the vehicle 102, e.g., responsive to receipt of an updated data map 120 that is used by the vehicle 102.

At 704, the OTA cloud server 118 models the data map 120 to generate a modeled data map 122. In an example, the data map modeling service 124 uses predictive modeling techniques to identify relationships between data elements of the data maps 120. For instance, the data modeling service 124 may fit curves, lines, or other data models to the data points of the data maps 120, in such a manner that the differences between the distances of data points from the proposed curve or line is minimized. The resultant data, e.g., coefficients of model equations and range information, may be incorporated into the modeled data map 122.

At 706, the OTA cloud server 118 sends the modeled data map 122 to the vehicle 102. In an example, the OTA cloud server 118 sends the modeled data map 122 over the wide-area network 112 to the modem 110 of the vehicle 102, to be processed by the software update service 126 of the TCU 108. From there, the modeled data map 122 may be provided to the data map expansion service 130 for use. In many examples, to preserve the integrity of the data of the modeled data map 122, a checksum may be computed on the data being transmitted, which is transmitted along with the modeled data map 122 for use in validating the integrity of the transmission by the recipient. In a simple example, the checksum may be created by performing operations using the elements of the modeled data map 122 such as addition or exclusive or. After operation 706, the process 700 ends.

Figure 8:
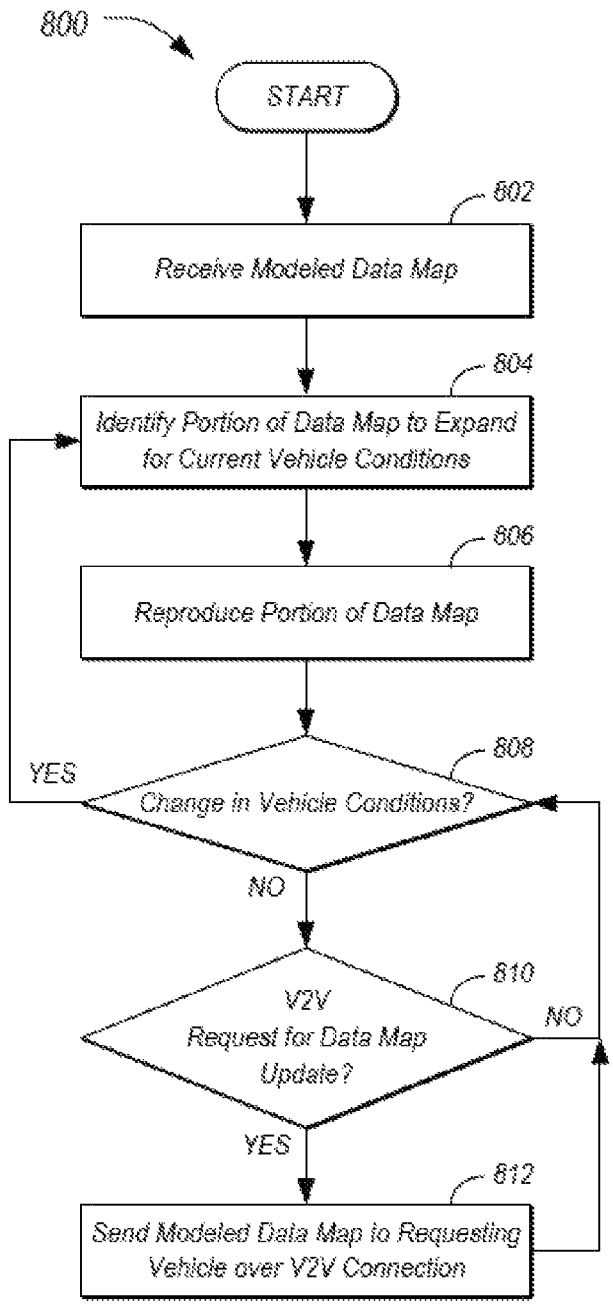
FIG. 8 illustrates an example process for the reproduction of data maps from modeled data maps.

FIG. 8 illustrates an example process 800 for the reproduction of data maps 120 from modeled data maps 122. In an example, the process 800 may be performed by the vehicle 102 in communication with the elements of the system 100.

At 802, the vehicle 102 receives the modeled data map 122. In an example, the vehicle 102 may receive the modeled data map 122 according to operation 706 of the process 700. The vehicle 102 may further validate the data using the checksum included in the received data. For instance, the vehicle 102 may also perform the same checksum calculation performed at operation 706 independently. If the checksums are equal, then data reproduction is valid. If the checksums are different, then a corruption occurred during the data transfer and a retransmit is needed.

At operation 804, the vehicle 102 identifies a portion of the data map 120 to be reproduced. In an example, the vehicle 102 may reproduce the entire data map 120. In another example, the vehicle 102 may reproduce only the portion of the data map 120 that corresponds to current vehicle conditions 102. In an example, for a data map 120 that has ambient temperature as an input, the vehicle 102 may utilize a chart 600 of weather patterns to identify a portion of the data map 120 that corresponds to conditions expected to occur for the current month of the year. Using the information, the vehicle 102 may determine a range of the data map 120 to reproduce.

At 806, the vehicle 102 reproduces the identified portion of the data map 120. In an example, the data map expansion service 130 of the vehicle 102 uses the coefficients received in the modeled data map 122 and range information determined at operation 804 to compute the values for the portion of the data map 120. These values may be stored to memory of a controller 104 for use in data lookup and vehicle operation.

At 808, the vehicle 102 determines whether a change in vehicle conditions have occurred. In an example, the vehicle 102 may periodically update the data map 120 to ensure that the reproduced portion of the data map 120 corresponds to current vehicle conditions. In another example, the vehicle 102 may update the data map 120 responsive to a miss to the data map 120, i.e., a request for a data entry that is not located in the reproduced portion of the data map 120. If a change in vehicle conditions is detected, control passes to operation 804. Otherwise control passes to operation 810.

At 810, the vehicle 102 determines whether a vehicle-to-vehicle request for a data update occurred. In an example, the vehicles 102 may communicate with one another over a direct vehicle-to-vehicle protocol, such as DSRC or sideline wireless communication. Using such communication, a vehicle 102 may ask if other vehicles 102 have an updated data map 120 available. Or, vehicles 102 having an updated data map 120 may advertise that they do. Or, vehicles 102 may advertise versions of data maps 120 that they have available, and may receive requests based on that broadcast to provide requested data maps 120. If a data map 120 is to be sent, control passes to operation 812. Otherwise, control returns to operation 808.

At 812, the vehicle 102 sends the modeled data map 122 to the recipient vehicle 102. In an example, as done in operation 808, this communication may be done over vehicle-to-vehicle communication. Accordingly, the vehicles 102 may be able to provide updated data maps 120 to one another over direct communication. After operation 812, control returns to operation 808.

Computing devices described herein, such as the controllers 104, TCU 108, and OTA cloud server 118, generally include computer-executable instructions where the instructions may be executable by one or more computing devices such as those listed above. Computer-executable instructions, such as those of the data service application 126 or remote data request service 124, may be compiled or interpreted from computer programs created using a variety of programming languages and/or technologies, including, without limitation, and either alone or in combination, JAVA™, C, C++, C#, VISUAL BASIC, JAVASCRIPT, PYTHON, JAVASCRIPT, PERL, PL/SQL, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The abstract of the disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A system comprising:
a vehicle having a hardware processor programmed to
identify a portion of a data map to be reproduced from a modeled data map according to current vehicle conditions, the data map specifying a calibration to control vehicle operation over various vehicle conditions, the modeled data map characterizing data elements of the data map according to a mathematical model,
reproduce the portion of the data map, as identified, using the modeled data map, the modeled data map including coefficients of an equation having one or more input variables, the data map comprising output values determined using the mathematical model by providing a range of input values corresponding to the portion of the data map to be reproduced, and
utilize the calibration, as reproduced, to control the vehicle operation.

2. The system of claim 1, wherein the mathematical model of the modeled data map includes a modeling of a two-dimensional data map as coefficients of a line equation.

3. The system of claim 1, wherein the mathematical model of the modeled data map includes a modeling of a three-dimensional data map as coefficients of a 3D plane equation.

4. The system of claim 1, wherein the portion of the data map includes a range of input values of the data map.

5. The system of claim 1, wherein the vehicle conditions include ambient temperature, and the processor is further programmed to utilize information indicative of temperatures for a current location of the vehicle to determine the portion of the data map to expand.

6. The system of claim 1, further comprising a vehicle controller configured to store the data map to a storage of the vehicle controller, wherein the hardware processor is included in the vehicle controller.

7. The system of claim 1, further comprising a vehicle-to-vehicle transceiver, wherein the vehicle-to-vehicle transceiver is configured to send the modeled data map to a second vehicle responsive to a request from the second vehicle to receive the data map over vehicle-to-vehicle transmission.

8. The system of claim 1, wherein the hardware processor is further programmed to receive the modeled data map over a communications network from a remote server.

9. A method comprising:
identifying, by hardware processor, a portion of a data map to be reproduced from a modeled data map according to current vehicle conditions, the data map specifying a calibration to control vehicle operation over various vehicle conditions, the modeled data map characterizing data elements of the data map according to a mathematical model,
reproducing, by the hardware processor, the portion of the data map, as identified, using the modeled data map, the modeled data map including coefficients of an equation having one or more input variables, the data map comprising output values determined using the mathematical model by providing a range of input values corresponding to the portion of the data map to be reproduced, and
utilizing, by the hardware processor, the calibration, as reproduced, to control the vehicle operation.

10. The method of claim 9, wherein the mathematical model of the modeled data map includes a modeling of a two-dimensional data map as coefficients of a line equation.

11. The method of claim 9, wherein the mathematical model of the modeled data map includes a modeling of a three-dimensional data map as coefficients of a 3D plane equation.

12. The method of claim 9, wherein the portion of the data map includes a range of input values of the data map.

13. The method of claim 9, wherein the vehicle conditions include ambient temperature, and further comprising utilizing information indicative of temperatures for a current location of the vehicle to determine the portion of the data map to expand.

14. The method of claim 9, further comprising storing, by a vehicle controller, the data map to a storage of the vehicle controller, wherein the hardware processor is included in the vehicle controller.

15. The method of claim 9, further comprising sending, by a vehicle-to-vehicle transceiver, the modeled data map to a second vehicle responsive to a request from the second vehicle to receive the data map over vehicle-to-vehicle transmission.

16. The method of claim 9, further comprising receiving, by the hardware processor, the modeled data map over a communications network from a remote server.

17. A non-transitory computer-readable medium comprising instructions that, when executed by a hardware processor, cause the hardware processor to perform operations including to:
identify, by hardware processor, a portion of a data map to be reproduced from a modeled data map according to current vehicle conditions, the data map specifying a calibration to control vehicle operation over various vehicle conditions, the modeled data map characterizing data elements of the data map according to a mathematical model,
reproduce, by the hardware processor, the portion of the data map, as identified, using the modeled data map, the modeled data map including coefficients of an equation having one or more input variables, the data map comprising output values determined using the mathematical model by providing a range of input values corresponding to the portion of the data map to be reproduced, and utilize, by the hardware processor, the calibration, as reproduced, to control the vehicle operation.

18. The medium of claim 17, wherein the mathematical model of the modeled data map includes a modeling of a two-dimensional data map as coefficients of a line equation.

19. The medium of claim 17, wherein the mathematical model of the modeled data map includes a modeling of a three-dimensional data map as coefficients of a 3D plane equation.

20. The medium of claim 17, wherein the portion of the data map includes a range of input values of the data map.

21. The medium of claim 17, wherein the vehicle conditions include ambient temperature, and further comprising instructions that, when executed by the hardware processor, cause the hardware processor to perform operations including to utilize information indicative of temperatures for a current location of the vehicle to determine the portion of the data map to expand.

22. The medium of claim 17, further comprising instructions that, when executed by the hardware processor, cause the hardware processor to perform operations including to store, by a vehicle controller, the data map to a storage of the vehicle controller, wherein the hardware processor is included in the vehicle controller.

23. The medium of claim 17, further comprising instructions that, when executed by the hardware processor, cause the hardware processor to perform operations including to send, by a vehicle-to-vehicle transceiver, the modeled data map to a second vehicle responsive to a request from the second vehicle to receive the data map over vehicle-to-vehicle transmission.

24. The medium of claim 17, further comprising instructions that, when executed by the hardware processor, cause the hardware processor to perform operations including to receive, by the hardware processor, the modeled data map over a communications network from a remote server.

* * * * *